UNITED STATES PATENT OFFICE.

CHARLES H. MULLIGAN, OF BROOKLYN, NEW YORK.

IMPROVEMENT IN COMPOSITIONS FOR COATING BURIAL-CASKETS.

Specification forming part of Letters Patent No. 160,784, dated March 16, 1875; application filed January 5, 1874.

*To all whom it may concern:*

Be it known that I, CHARLES H. MULLIGAN, of Brooklyn, Kings county, New York, have invented an improved process for preserving from decay and rendering free from damp boxes containing burial-caskets or coffins which may be buried in the ground, and for preserving burial-caskets and coffins to be placed in vaults of cemeteries, and for coating burial-caskets and coffins to be used in the transportation of dead bodies, of which the following is a specification:

Take of asphaltum two-thirds, and, while melted, add one-third of coal-tar pitch. When these are well mixed together, add sufficient clean sand and mineral oil to render the mixture of sufficient consistency to allow the mixture to be easily dipped and poured. While the mixture is in this condition I plunge the box or coffin or other casket into the boiler which contains the composition, and allow it to remain there till thoroughly coated within and without; then withdrawn, allowed to cool, and redipped, till, by repeated dippings, it acquires the desired thickness.

What I claim is—

A composition for coating burial-caskets, consisting of asphaltum, coal-tar pitch, sand, and mineral oil, in about the proportions specified, and for the purpose substantially set forth.

CHS. H. MULLIGAN.

Witnesses:
FREDK. F. PURDE,
JOHN E. NORCROSS.